US007097759B2

(12) United States Patent
Mukkamala

(10) Patent No.: US 7,097,759 B2
(45) Date of Patent: Aug. 29, 2006

(54) CARBONYL, THIOCARBONYL OR IMINE CONTAINING COMPOUNDS AS ASPHALTENE DISPERSANTS IN CRUDE OIL

(75) Inventor: Ravindranath Mukkamala, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 574 days.

(21) Appl. No.: 10/444,380

(22) Filed: May 23, 2003

(65) Prior Publication Data

US 2004/0235676 A1 Nov. 25, 2004

(51) Int. Cl.
*C10L 1/10* (2006.01)
*C08L 77/00* (2006.01)
*C08L 47/00* (2006.01)
*C08L 29/00* (2006.01)

(52) U.S. Cl. .................... 208/48 AA; 524/64; 524/65; 524/69; 524/134; 524/484; 525/142

(58) Field of Classification Search ................. 44/393, 44/399, 450; 208/48 AA; 524/64, 65, 69, 524/134, 484; 525/142, 143
See application file for complete search history.

(56) References Cited

U.S. PATENT DOCUMENTS 3,452,002 A * 6/1969 Brasch ...................... 540/454
4,746,328 A 5/1988 Sakamoto et al.
5,169,411 A 12/1992 Weers
5,388,644 A 2/1995 Romocki
5,690,174 A 11/1997 Chapman et al.
5,948,237 A 9/1999 Miller et al. .................. 208/22
6,168,702 B1 1/2001 Varadaraj et al. ........... 204/567
6,344,431 B1 2/2002 von Tapavicza et al.
6,402,934 B1 6/2002 Chheda et al. ................ 208/44
2004/0163995 A1* 8/2004 Cornelisse ............. 208/48 AA

FOREIGN PATENT DOCUMENTS

| | | | |
|---|---|---|---|
| EP | 1 357 172 | A2 | 10/2003 |
| EP | 1 359 208 | A | 11/2003 |
| EP | 1 359 209 | A | 11/2003 |
| FR | 2789999 | FR | 2/1999 |
| WO | WO 95/20637 | | 8/1995 |
| WO | 01/55281 | A1 | 8/2001 |
| WO | WO 01 55281 | A | 8/2001 |

* cited by examiner

*Primary Examiner*—Walter D. Griffin
*Assistant Examiner*—Prem C. Singh
(74) *Attorney, Agent, or Firm*—Kenneth Crimaldi

(57) ABSTRACT

A method for dispersing asphaltenes in a petroleum product by adding to the petroleum product 0.001% to 20% of at least one compound having formula (V)

(V)

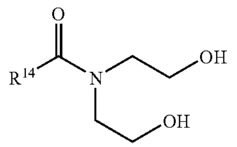

wherein $R^{14}$ is $C_{15}$–$C_{21}$ alkyl. In addition to dispersing asphaltenes, the method of the present invention typically also increases demulsibility, reduces viscosity, reduces sediment formation, reduces surface fouling and reduces corrosion.

6 Claims, No Drawings

CARBONYL, THIOCARBONYL OR IMINE CONTAINING COMPOUNDS AS ASPHALTENE DISPERSANTS IN CRUDE OIL

BACKGROUND

This invention relates generally to a composition useful in processing of crude oil.

Certain petroleum products, including heavy crude oils, which include materials referred to as "tars," "petroleum tars" or "tar sands," are rich in asphaltenes, metals and resins. The presence of these types of compounds can lead to various problems in the recovery, transportation, treatment and refining of crude oils, including increased viscosity, formation of stable emulsions, fouling and corrosion. International Pat. Appl. No. WO 95/20637 discloses stabilization of asphaltenes in crude oil using a variety of compounds, including amides and esters. However, the only amides or esters disclosed that have polar substituents are those containing 2-hydroxyethyl, 3-hydroxypropyl, or 4-hydroxybutyl groups.

The problem addressed by this invention is to find a composition suitable for improving processing of petroleum products.

STATEMENT OF INVENTION

The present invention is directed to a composition comprising: (a) 0.001% to 20% of at least one compound having: (i) at least one carbonyl-, thiocarbonyl- or imine-containing functional group which is not a carboxyl group; (ii) at least one polar group two to ten chemical bonds from a carbonyl, thiocarbonyl or imine carbon; and (iii) at least ten carbon atoms; and (b) crude oil; provided that: (i) when the only carbonyl-, thiocarbonyl- or imine-containing functional group is an amide group and the only other polar group occurs in a 2-hydroxyethyl, 3-hydroxypropyl or 4-hydroxybutyl group; then said compound has an alkyl substituent having at least 15 carbon atoms; and (ii) when the only carbonyl-, thiocarbonyl- or imine-containing functional group is an ester or keto group and the compound has a 2-hydroxyethyl, 3-hydroxypropyl or 4-hydroxybutyl group; then at least one polar group is present other than a keto group, or a hydroxy group from a 2-hydroxyethyl, 3-hydroxypropyl or 4-hydroxybutyl group.

This invention is directed further to a method for dispersing asphaltenes in a petroleum product. The method comprises adding to the petroleum product 0.001% to 20% of at least one compound having: (i) at least one carbonyl-, thiocarbonyl- or imine-containing functional group which is not a carboxyl group; (ii) at least one polar group two to ten chemical bonds from a carbonyl, thiocarbonyl or imine carbon; and (iii) at least ten carbon atoms; provided that: (i) when the only carbonyl-, thiocarbonyl- or imine-containing functional group is an amide group and the only other polar group occurs in a 2-hydroxyethyl, 3-hydroxypropyl or 4-hydroxybutyl group; then said compound has an alkyl substituent having at least 15 carbon atoms; and (ii) when the only carbonyl-, thiocarbonyl- or imine-containing functional group is an ester or keto group and the compound has a 2-hydroxyethyl, 3-hydroxypropyl or 4-hydroxybutyl group; then at least one polar group is present other than a keto group, or a hydroxy group from a 2-hydroxyethyl, 3-hydroxypropyl or 4-hydroxybutyl group.

DETAILED DESCRIPTION

All percentages are weight percentages based on the entire composition, unless otherwise indicated. A "polar" group is a functional group selected from among the following: hydroxy, amino, alkylamino, hydroxylamino, ammonium, alkylammonium, oxime, keto, carboxylate ion, amide, alkyl amide, nitroso, mercapto, alkylthio, alkylsulfonyl, alkylsulfenyl, and alkylsulfinyl. An "alkyl" group is a hydrocarbyl group having from one to twenty-two carbon atoms in a linear, branched or cyclic arrangement. A "difunctional alkyl" group is an alkyl group having two points of attachment, e.g., $—CH_2—$, $—CH_2CH_2—$, and $—CH_2CH(CH_3)—$. Alkyl groups optionally have one or more double or triple bonds. Substitution on alkyl groups of one or more of halo, cyano, alkyl, alkoxy, or the aforementioned polar groups is permitted; alkoxy groups may in turn be substituted by one or more halo substituents. A "heteroalkyl" group is an alkyl group in which at least one carbon has been replaced by O, NR, or S, wherein R is hydrogen, alkyl, heteroalkyl, aryl or, aralkyl. An "aryl" group is a substituent derived from an aromatic hydrocarbon compound. An aryl group has a total of from six to twenty ring atoms, and has one or more rings which are separate or fused. An "aralkyl" group is an "alkyl" group substituted by an "aryl" group. A "heterocyclic" group is a substituent derived from a heterocyclic compound having from five to twenty ring atoms, at least one of which is nitrogen, oxygen or sulfur. Preferably, heterocyclic groups do not contain sulfur. Substitution on aryl or heterocyclic groups of one or more of halo, cyano, alkyl, heteroalkyl, alkoxy or the aforementioned polar groups is permitted, with substitution by one or more halo groups being possible on alkyl, heteroalkyl or alkoxy groups. An "aromatic heterocyclic" group is a heterocyclic group derived from an aromatic heterocyclic compound. Preferably, heterocyclic groups in compounds used in this invention are aromatic heterocyclic groups.

In the present invention, at least one compound having: (i) at least one carbonyl-, thiocarbonyl- or imine-containing functional group which is not a carboxyl group; (ii) at least one polar group two to ten chemical bonds from a carbonyl, thiocarbonyl or imine carbon; and (iii) at least ten carbon atoms; is added to a petroleum product, with the total amount of said compound(s) being from 0.001% to 20%, preferably from 0.001% to 10%, more preferably from 0.01% to 10%, more preferably from 0.01% to 1%, and most preferably from 0.02% to 0.2%. A carbonyl-, thiocarbonyl- or imine-containing functional group is any functional group, other than carboxyl, containing a carbonyl, thiocarbonyl or imine functionality, including, but not limited to: amide, ester, keto, imine, thioester, thioamide, aldehyde, carboxylate, carbamate, xanthate, urea, guanidine, thiourea and β-ketoester. The "carbonyl, thiocarbonyl or imine carbon" is any carbonyl, thiocarbonyl or imine carbon of a carbonyl-, thiocarbonyl- or imine-containing functional group, i.e., the carbon atom of a C═W functionality, where W is O, S or N. In some cases, a carbonyl-, thiocarbonyl- or imine-containing functional group has more than one carbonyl, thiocarbonyl or imine carbon, e.g., a β-ketoester group has two carbonyl carbons. In the present invention, the separation between a carbonyl, thiocarbonyl or imine carbon and a polar group is measured by the number of covalent chemical, bonds intervening between either: (i) the atom of the polar group through which it is attached (e.g., the oxygen of hydroxy; the nitrogen of amino, hydroxylamino, ammonium or nitroso; or the sulfur of sulfur-containing groups); or (ii) a C═W carbon of the polar group (e.g., the carbonyl carbon of amide or the imine carbon of oxime); and a carbonyl, thiocarbonyl or imine carbon. For example, in oleyl acetoacetate, the carbonyl carbon of the keto group is two bonds from the carbonyl carbon of the ester group, while in N-(2-hydroxyethyl)stearamide, the oxygen of the hydroxy group is four bonds from the amide carbonyl carbon. Preferably, at least one polar group in a compound of this invention is located two to eight chemical bonds from a carbonyl, thiocarbonyl or imine carbon, more preferably from two to seven chemical bonds, and most preferably two, three, four, five or six chemical bonds from a carbonyl, thiocarbonyl or imine carbon. Preferably, a carbonyl-, thiocarbonyl- or imine-containing functional group is selected from the group consisting of: amide, ester, imine, thioester, thioamide, carbamate, urea and thiourea. Preferably, a carbonyl-, thiocarbonyl- or imine-containing functional group is not part of a heterocyclic ring. Preferably, a compound used in this invention is aliphatic. Preferably, a compound used in this invention is acyclic.

A compound used in the composition or method of this invention preferably is represented by formula (I), (I)

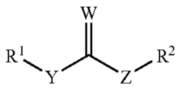

wherein Y is $C_1$–$C_3$ difunctional alkyl, O, S, $NR^3$ or is absent; Z is hydrogen (in which case $R^2$ is absent), O, S, $NR^4$ or is absent; W is O, S, or $NR^5$; $R^1$, $R^2$, $R^3$, $R^4$ and $R^5$ independently are hydrogen or organic functional groups; and at least one of Y, $R^1$, $R^2$, $R^3$, $R^4$ and $R^5$ is substituted by at least one polar group two to ten chemical bonds from the carbonyl, thiocarbonyl or imine carbon. Preferably, $R^1$, $R^2$, $R^3$, $R^4$ and $R^5$ independently are hydrogen, alkyl, heteroalkyl, heterocyclic, aryl or aralkyl. Preferably, at least one of $R^1$, $R^2$, $R^3$, $R^4$ and $R^5$ has at least 7 carbon atoms, more preferably at least 9 carbon atoms, more preferably at least 11 carbon atoms, and most preferably at least 15 carbon atoms. Preferably, when the only carbonyl-, thiocarbonyl- or imine-containing functional group is an amide group, and at least one of $R^1$, $R^2$, $R^3$, $R^4$ and $R^5$ is a linear alkyl group substituted only by a single hydroxy group at the carbon furthest from the amide carbonyl carbon, then at least one of $R^1$, $R^2$, $R^3$, $R^4$ and $R^5$ has at least 15 carbon atoms and no hydroxy groups.

Preferably, a compound used in this invention is not in the form of a salt having an anion and a cation, i.e., a salt that is not a zwitterion; more preferably the compound is a neutral compound. Preferably, when the only carbonyl-, thiocarbonyl- or imine-containing functional group is an ester or keto group, and at least one of $R^1$, $R^2$, $R^3$, $R^4$ and $R^5$ is a linear alkyl group substituted only by a single hydroxy group at the carbon furthest from the ester or keto carbonyl carbon, then at least one polar group is present other than the single hydroxy group or keto group; most preferably, the compound has an alkyl substituent having at least 15 carbon atoms. Preferably, W, Y and Z are not all O or all S.

An "organic functional group" is a functional group which does not contain metal atoms, and which has from one to twenty-two carbon atoms, hydrogen atoms, and optionally heteroatoms, including but not limited to: nitrogen, oxygen, sulfur, phosphorus and halogen atoms. An organic functional group optionally contains double and/or triple bonds; rings, which are linked or fused; and if the group is wholly or partly acyclic, the acyclic part can be linear or branched. Preferably, an organic functional group is an alkyl, heteroalkyl, aryl, aralkyl, heterocyclic or heterocyclic-alkyl group. In a preferred embodiment of this invention, at least one of the organic functional groups is a $C_2$–$C_{22}$ alkyl or heteroalkyl group, more preferably a $C_7$–$C_{22}$ alkyl or heteroalkyl group, more preferably a $C_9$–$C_{22}$ alkyl or heteroalkyl group, and most preferably, a $C_{15}$–$C_{22}$ alkyl group. Preferably, alkyl or heteroalkyl groups are unsubstituted. A compound used in this invention optionally contains other carbonyl-, thiocarbonyl- or imine-containing functional groups on one or more of the organic functional groups, preferably for a total of one to three carbonyl-, thiocarbonyl- or imine-containing functional groups. Preferably, a polar group is a hydrogen bond donor, e.g., hydroxy, amino, alkylamino, ammonium, hydroxylamino, oxime, sulfonic acid or amide. More preferably, a polar group is hydroxy, amino, alkylamino or hydroxylamino. Most preferably, a polar group is hydroxy or hydroxylamino.

In a preferred embodiment of the invention, a compound of formula (I) is represented by formula (II), (II)

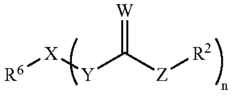

wherein X is O, S, N, NH, or $NR^7$; $R^6$ and $R^7$ independently are alkyl, heteroalkyl, aryl, heterocyclic or aralkyl; and n is one or two. It will be apparent to those skilled in the art that n=1 when X is O, S, NH or $NR^7$; and n=2 when X is N. Preferably, $R^6$ is $C_2$–$C_{22}$ alkyl, more preferably $C_7$–$C_{22}$ alkyl, more preferably $C_9$–$C_{22}$ alkyl, and most preferably, $C_{15}$–$C_{22}$ alkyl. Preferably, Y is $—CH_2CH_2—$ or $—CH_2CH(CH_3)—$. Preferably, $R^2$ is alkyl or aralkyl. Preferably, W is O, and Z is O or $NR^4$. Compounds of formula (II) in which Y is $—CH_2CH_2—$ or $—CH_2CH(CH_3)—$, W is O and Z is O or $NR^4$ may be derived from reaction of a fatty amine, thiol or alcohol, $R^6XH$, with an acrylate or methacrylate ester or an acrylamide or methacrylamide. Preferably, X is NH, and the compound of formula (II) is derived from an unsubstituted $C_{15}$–$C_{22}$ alkyl amine, $R^6NH_2$, preferably one which is an oil-soluble amine. In one embodiment, the alkyl amine is a tertiary alkyl primary amine., i.e., a primary amine in which the alkyl group is attached to the amino group through a tertiary carbon. Examples of commercially available tertiary alkyl primary amines are the Primene™ amines available from Rohm and Haas Company, Philadelphia, Pa.

In a preferred embodiment of this invention, the compound of formula (I) is an imine having a polar group two to ten chemical bonds from the imine carbon. In this embodiment, W is $NR_5$, Z is hydrogen or is absent (i.e., $ZR^2$ is hydrogen or $R^2$), and Y is absent, resulting in the structure depicted in formula (III)

(III)

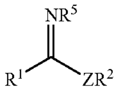

wherein at least one of $R^1$, $R^2$ and $R^5$ contains a polar group two to ten chemical bonds from the imine carbon. Preferably, the polar group is hydroxy. Preferably, $R^5$ is a $C_{15}$–$C_{22}$ alkyl amine. In one embodiment, the alkyl amine is a tertiary alkyl primary amine.

In a preferred embodiment of the invention, an imine compound of formula (III) is selected from the group consisting of

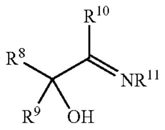

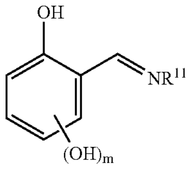

and

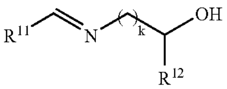

wherein $R^8$, $R^9$ and $R^{10}$ independently are hydrogen or alkyl; $R^{11}$ is $C_2$–$C_{22}$ alkyl; $R^{12}$ is hydrogen or alkyl; m is zero or one; and k is one, two or three. Preferably, $R^{11}$ is $C_7$–$C_{22}$ alkyl, more preferably, $C_9$–$C_{22}$ alkyl, and most preferably, $C_{15}$–$C_{22}$ alkyl.

In a preferred embodiment of this invention, the compound of formula (I) is an amide having a polar group two to ten chemical bonds from the amide carbonyl carbon. In this embodiment, W is O, Z is $NR^4$, and Y is $C_1$–$C_3$ difunctional alkyl or is absent, resulting in the structure depicted in formula (IV)

(IV)

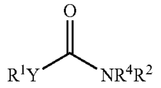

wherein at least one of Y, $R^1$, $R^2$ and $R^4$ contains a polar group two to ten chemical bonds from the amide carbon. Preferably, the polar group is hydroxy. In a preferred embodiment of the invention, an amide compound of formula (IV) is selected from the group consisting of

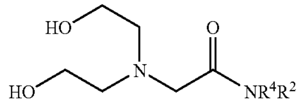

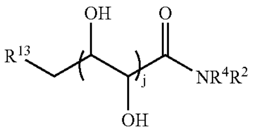

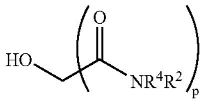

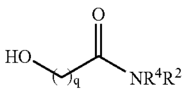

and

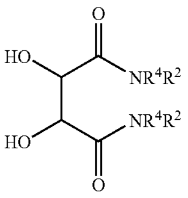

wherein $R^4$ and $R^2$ are as defined herein; $R^{13}$ is H or OH; j is one or two; p is one, two or three; and q is one, two, three or four. Preferably, at least one of $R^4$ and $R^2$ is $C_8$–$C_{21}$ alkyl, more preferably, at least one of $R^4$ and $R^2$ is $C_{15}$–$C_{21}$ alkyl. Preferably, one of $R^4$ and $R^2$ is hydrogen.

In another preferred embodiment of this invention, an amide of formula (IV) has formula (V)

(V)

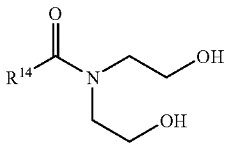

wherein $R^{14}$ is $C_{15}$–$C_{21}$ alkyl. Preferably, $R^{14}$ is $C_{15}$–$C_{17}$ alkyl, most preferably acyclic linear alkyl, including, but not limited to the alkyl group of oleic acid (heptadec-8(Z)-ene-1-yl), n-heptadecyl, and mixtures of $C_{15}$–$C_{17}$ acyclic linear alkyl groups, e.g., those alkyl mixtures existing in naturally-occurring $C_{16}$–$C_{18}$ fatty acids.

In a preferred embodiment of this invention, the compound of formula (I) is an ester having a polar group two to ten chemical bonds from the ester carbonyl carbon. In this embodiment, W is O; Y is $C_1$–$C_3$ difunctional alkyl or is absent; and Z is O, resulting in the structure depicted in formula (VI)

(VI)

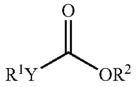

wherein $R^1$ and $R^2$ are organic functional groups, and at least one of Y, $R^1$ and $R^2$ is substituted by at least one polar group two to ten chemical bonds from the ester carbon. In a preferred embodiment of the invention, Y is absent, and at least one of $R^1$ and $R^2$ has at least 15 carbon atoms. Preferably, the polar group is hydroxy.

In another preferred embodiment of the invention, an ester of formula (VI) is represented by formula (VII), (VII)

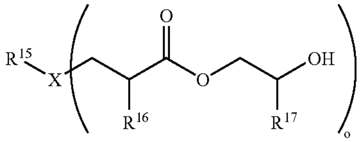

wherein $R^{15}$ is alkyl, heteroalkyl, aryl, heterocyclic or aralkyl; $R^{17}$ is hydrogen or alkyl; X is as defined previously; $R^{16}$ is hydrogen or methyl; and o is one or two. It will be apparent to those skilled in the art that o=1 when X is O, S, NH or $NR^7$; and o=2 when X is N. Preferably, $R^{15}$ is $C_7$–$C_{22}$ alkyl, more preferably, $C_9$–$C_{22}$ alkyl, and most preferably, $C_{15}$–$C_{22}$ alkyl. Preferably, $R^{17}$ is hydrogen, methyl or hydroxymethyl. Compounds of formula (VII) typically are derived from reaction of a fatty amine, thiol or alcohol, $R^{15}XH$, with an acrylate or methacrylate hydroxyalkyl ester. Preferably, X is NH, and the compound of formula (VII) is derived from an unsubstituted $C_{15}$–$C_{22}$ alkyl amine, $R^{15}NH_2$, preferably one which is an oil-soluble amine. In one embodiment, the alkyl amine is a tertiary alkyl primary amine.

In addition to dispersing asphaltenes, the composition of the present invention typically also increases demulsibility, reduces viscosity, reduces sediment formation, reduces surface fouling and reduces corrosion. For crude oil recovery, the composition of the present invention can be injected directly into an injection well, or preferably diluted with solvent prior to injection. Suitable solvents include but are not limited to: petroleum distillates such as kerosene and gas oil; linear and branched aliphatic solvents such as pentane, hexane, mixtures of nonanes and 2-ethylhexanes; cycloaliphatic mixtures commonly known as naphtha; aromatic solvents such as toluene, xylenes and commercial aromatic solvent mixtures; esters; ethers; alcohols such as ethanol, isopropanol, octanol and dodecanol; ketones such as acetone, cyclohexanone and acetophenone; and other polar solvents. Preferred dilutions are 0.01 to 50 wt % of the compound in the solvent, more preferred dilutions being 0.01 to 20 wt %, more preferred dilutions being 0.1 to 10%, and most preferred dilutions being 1 to 10 wt %.

EXAMPLES

Example 1

(2-Hydroxyethyl)amides

Performance Criteria and Test Methods:

Asphaltene Dispersancy-test tube method: This test requires a previously made dispersion of asphaltene in xylenes (Aromatic 150 solvent) or asphaltenic heavy crude diluted in xylenes (Aromatic 150 solvent) at a known concentration. A solution of an additive formulation (0.1 mL, the active ingredient was typically at 5–10 wt %, making the treat rate 500–1000 ppm) was taken in to a 15.0 mL graduated glass centrifuge tube, and hexanes added such that the total volume in the tube became 10.0 mL. To this mixture of additive and hexanes, asphaltenic stock solution (0.1 mL) was added. The test tube was then capped, shaken vigorously for about a minute or 40–60 times by hand and allowed to stand. The volume of any precipitated asphaltenes settled at the bottom of the tube was recorded at 10, 30, 60, 90 and 1440 (24 h) min intervals. When no additive was used, the volume of asphaltenes precipitated in the first 0.5–1 h was 0.4–0.5 mL (4–5%); in fact, it was important to initially adjust the concentration of the asphaltene stock in such a way that under these conditions of dilution with paraffinic solvents, a 4–5 vol % of asphaltenic precipitation occurred. When the additive was an effective dispersant of asphaltene, then no precipitate was formed up to 24 h (Rating=2; good). In some cases, no precipitation was observed in over 24 h to several days (Rating=2+; excellent). If the additive was not a dispersant, then an almost immediate precipitation of asphaltenes occurred (Rating=0; poor). Results for several (2-hydroxyethyl)amides are reported in Table 1. Results for several other amide and imine compounds are reported in Table 2.

TABLE 1

(2-Hydroxyethyl)amide Derivatives

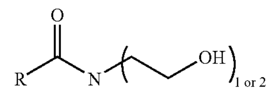

| | | |
|---|---|---|
| 1) | Mackamide ™ MO [Oleamide DEA (1:1)]; R = C-17 (oleyl) formulated at 5% in hexanes; treat rate: 500 ppm | 2+ |
| 2) | Mackamide ™ FTOA [Oleamide DEA (1:1)]; R = C-17 (oleyl) formulated at 5% in hexanes; treat rate: 500 ppm | 2+ |
| 3) | Mackamide ™ S [Soyamide DEA (1:1)]; R = C-15–17 formulated at 5% in hexanes; treat rate: 500 ppm | 2+ |
| 4) | Mackamide ™ C [Cocamide DEA (1:1)]; R = C-11–13 formulated at 5% in hexanes; treat rate: 500 ppm | 0 |
| 5) | Mackamide ™ CD-10 [Capramide DEA (1:1)]; R = C-9 formulated at 10% in hexanes; treat rate: 1000 ppm | 0 |
| 6) | Mackamide ™ AME-100 [(Acetamide MEA (1:1)]; R = C-1 formulated at 10% in hexanes; treat rate: 1000 ppm | 0 |

"DEA" = diethanolamine; "MEA" = monoethanolamine. Mackamide ™ amides are commercial products available from McIntyre Group Limited (University Park, IL).

The treat rate is the concentration of the amide in the crude oil.

TABLE 2

Ester, Amide and Imine Compounds

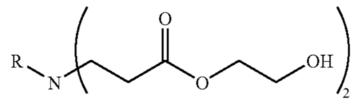

1), 2)

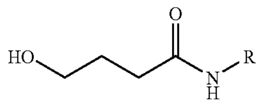

3)

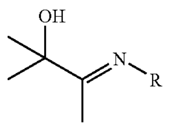

4)

| | | |
|---|---|---|
| 1) | 2:1 adduct HEA:n-octadecylamine; R C-18 (saturated) formulated at 30% in hexanes; treat rate: 3000 ppm | 2+ |
| 2) | 2:1 adduct HEA:oleylamine; R = C-18 (oleyl) formulated at 10% in hexanes; treat rate: 1000 ppm | 2+ |
| 3) | R = C-18 (oleyl) [oleylamine-γ-butyrolactone adduct] formulated at 10% in hexanes; treat rate: 1000 ppm | 2 |
| 4) | R = C-18 (oleyl) formulated at 10% in hexanes; treat rate: 1000 ppm | 2 |

"HEA" = 2-hydroxyethyl acrylate; AROMATIC 150 SOLVENT is a solvent mixture with a boiling range of 184–204° C. which contains xylene isomers, and which is available from Exxon Mobil Chemical Co., Houston TX.

The results presented in Table 1, entries 1) to 6), and Table 2, entry 3), demonstrate that amides in which the only other polar group (other than amide) is a 2-hydroxyethyl, 3-hydroxypropyl or 4-hydroxybutyl group are effective dispersants only when substituted by an alkyl group that has at least 15 carbons.

The invention claimed is:

1. A method for dispersing asphaltenes in a petroleum product; said method comprising adding to the petroleum product 0.001% to 20% of at least one compound having formula (V)

(V)

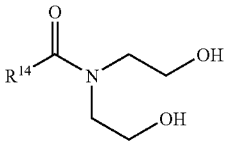

wherein $R^{14}$ is $C_{15}$–$C_{21}$ alkyl.

2. The method of claim 1 in which 0.01% to 1% of said at least one compound is present.

3. The method of claim 2 in which $R^{14}$ is $C_{15}$–$C_{17}$ alkyl.

4. A method for dispersing asphaltenes in a petroleum product; said method comprising adding to the petroleum product 0.001% to 20% of at least one compound having formula (V)

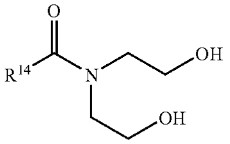

wherein q is one, two, three or four; $R^2$ and $R^4$ independently are hydrogen, alkyl, heteroalkyl, heterocyclic, aryl or aralkyl; provided that at least one of $R^2$ and $R^4$ is $C_{15}$–$C_{21}$ alkyl.

5. The method of claim 4 in which q=3 and $R^4$ is hydrogen.

6. The method of claim 5 in which 0.01% to 1% of said at least one compound is present.

* * * * *

UNITED STATES PATENT AND TRADEMARK OFFICE

CERTIFICATE OF CORRECTION

PATENT NO. : 7,097,759 B2
APPLICATION NO. : 10/444380
DATED : August 29, 2006
INVENTOR(S) : Mukkamala It is certified that error appears in the above-identified patent and that said Letters Patent is hereby corrected as shown below:

Col. 10 lines 6-14 in claim 4, please replace the current structure with the following:

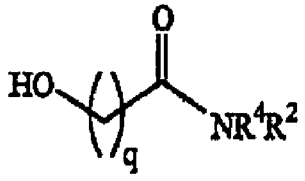

Signed and Sealed this

Twenty-seventh Day of March, 2007

JON W. DUDAS
*Director of the United States Patent and Trademark Office*